H. J. SMITH.
FRICTION CLUTCH.
APPLICATION FILED MAR. 11, 1909.

975,578.

Patented Nov. 15, 1910.
2 SHEETS—SHEET 1.

Witnesses:
Edw. Lindmueller
H. R. Sullivan

Inventor:
Harry J Smith
By Thurston Woodward
His Attorneys.

UNITED STATES PATENT OFFICE.

HARRY J. SMITH, OF LAKEWOOD, OHIO, ASSIGNOR TO THE HILL CLUTCH COMPANY, A CORPORATION OF OHIO.

FRICTION-CLUTCH.

975,578.     Specification of Letters Patent.     Patented Nov. 15, 1910.

Application filed March 11, 1909. Serial No. 482,648.

*To all whom it may concern:*

Be it known that I, HARRY J. SMITH, a citizen of the United States, residing at Lakewood, in the county of Cuyahoga and State of Ohio, have invented a certain new and useful Improvement in Friction-Clutches, of which the following is a full, clear, and exact description.

This invention, in the precise form shown, is an improvement in the type of friction clutches in which pairs of inversely and radially movable jaws and suitable operating mechanism are employed for the purpose of grasping between said jaws an interposed cylindrical clutch flange. Clutches of this type are in wide general use, and are made for use with clutch flanges of various diameters and are adapted to be applied to shafts of various diameters. In order, therefore, for a dealer to keep a supply of such clutches which will enable him to fill promptly all orders irrespective of the diameter of shafts and the diameter of the clutch flanges with which they are to be used, it is necessary for him to keep in stock a great variety.

One object of the present invention is to produce clutches of such construction that a complete assortment can be kept in stock by a very greatly reduced number of parts; and this object is attained by making the clutch mechanism detachable from and attachable to various supporting members which are alike, except as to the size of the hub bore. With clutches of this construction a dealer might keep a complete variety of spiders having various sized bores and adapted for various sized flanges, and just a few clutch mechanisms, and he might attach a suitable clutch mechanism to any supporting member which might be suitable for an order.

Another object of the invention is to provide a clutch construction which will permit the easy removal and replacement of the various parts of the clutch mechanism.

With these ends in view the invention consists in the combinations of parts hereinafter described and pointed out definitely in the claims.

Figure 1:
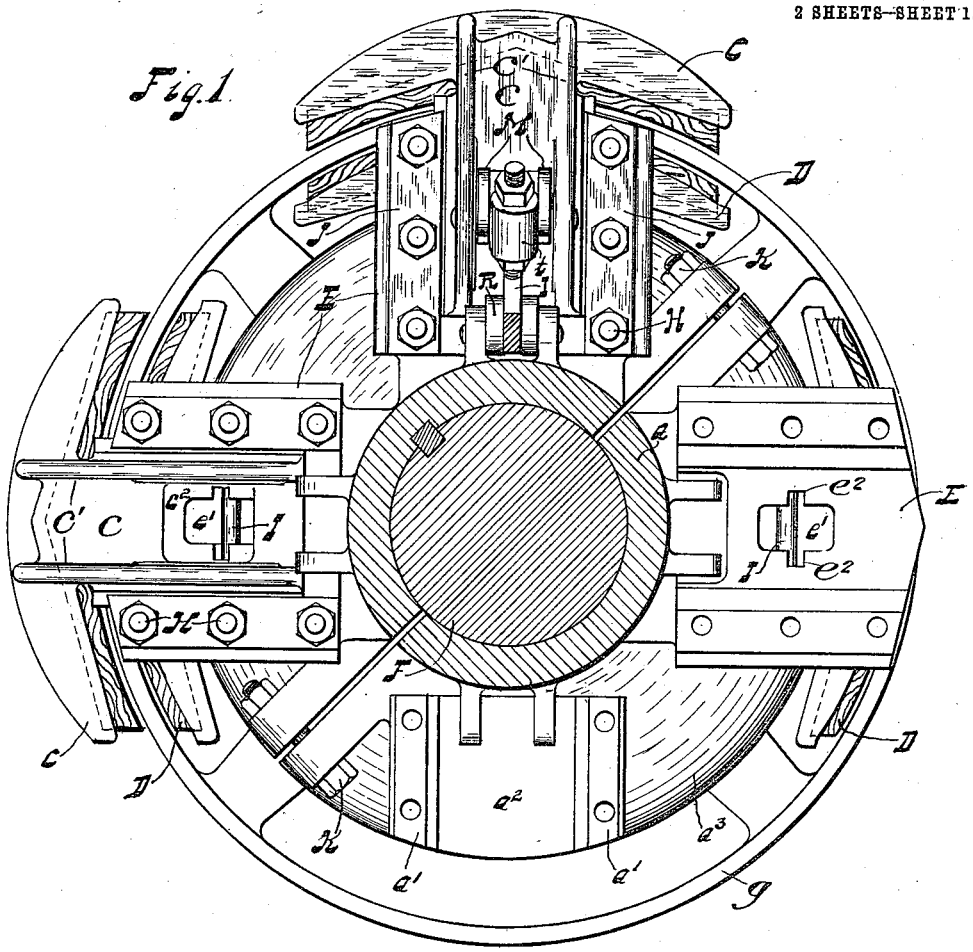
Figure 2:
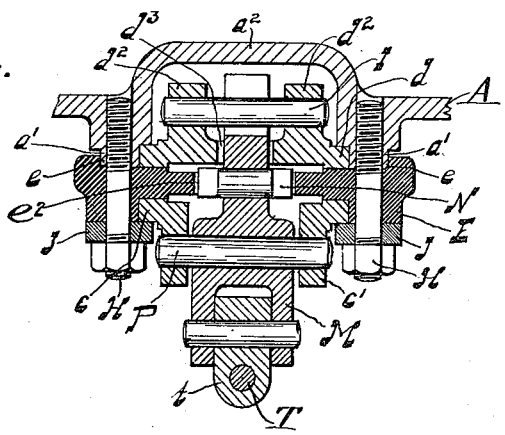
Figure 3:
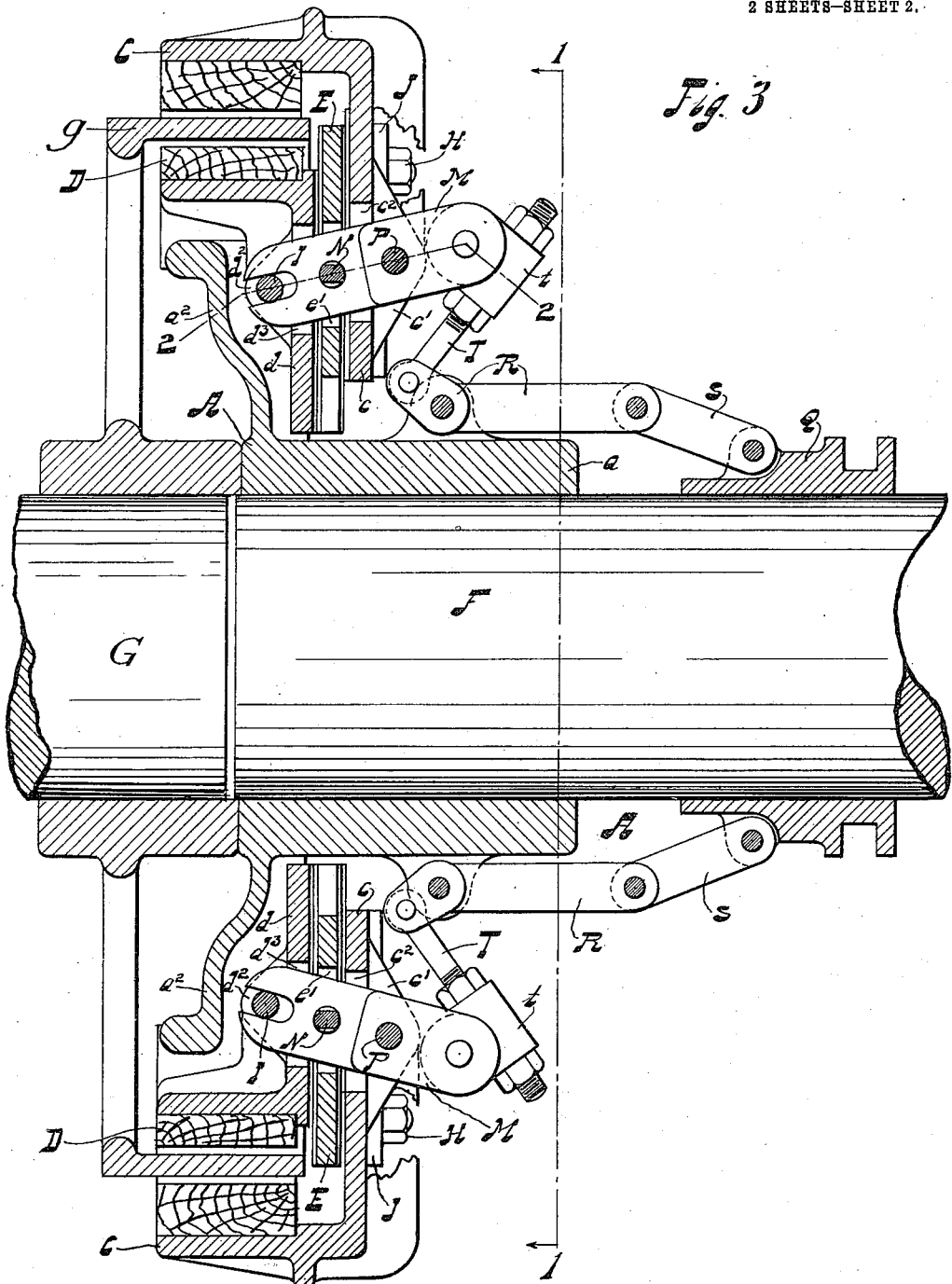

In the drawings, Figure 1 is a sectional front view in the plane indicated by line 1—1 of Fig. 3 of a four armed clutch embodying the invention, the various arms of said clutch being in various stages of completeness—that is to say, the arm at the top of the figure carries one complete set of clutch mechanism. The horizontal arm at the left of the figure shows the construction as it would be if the rocker for operating the jaws and the mechanism for operating the rocker were removed. The arm at the right of the figure shows the arm as it would appear when the outer jaw has been removed; and the arm at the bottom of the figure shows an arm of the supporting member with all of the clutch mechanism removed therefrom. Fig. 2 is a sectional plan view in the plane indicated by line 2—2 of Fig. 3; and Fig. 3 is a central vertical section of the clutch.

Referring to the parts by letters, A represents the supporting member of the clutch, which is preferably split longitudinally into two parts capable of being secured together by bolts K when the two parts thereof embrace a shaft, as F. This supporting member includes a hub $a$, and as many radial arms extending outward from the hub as may be required. Each of these so-called arms consists of two parallel bars $a'$ which may be connected along their rear edges by the backwardly curved web $a^2$—these bars being parallel with a radial line midway between them. All of these arms may be, as shown, parts of a web $a^3$ which extends out from the hub, but the parts of the web between the so-called arms has no function except to give additional strength to the structure.

Associated with each arm are a pair of clutch jaws C and D and their supporting and operating mechanism which will now be described. The clutch jaws are arranged on the inner and outer sides of a clutch flange or ring $g$ with which they coöperate and which is mounted on a shaft G arranged in line with the shaft F.

E represents a fulcrum plate which is secured against the front faces of the bars $a'$ of an arm by bolts H. Each fulcrum plate has two rearwardly projecting ribs $e, e$ which engage the remote sides of said bars; that is to say, the two bars $a', a'$, constituting an arm, lies between the ribs $e, e$, of the fulcrum plate, and thereby the bolts H are relieved from lateral strain incident to the use of the clutch. The proximate faces of the bars $a'$ are rabbeted lengthwise, and thereby there are formed between these rabbeted grooves and the fulcrum plate radial guideways for the shanks $d$ of the inner jaw D, as clearly shown in Fig. 2. The shank c of the associated outer jaw C moves in similar guide-ways formed by rabbeted grooves on the outer face of the fulcrum plate, and gibs J which are fastened by the bolts H to the fulcrum plate overhang the edges of the jaw shank. Each inner jaw shank has the rearwardly extended ears $d^2$, and a pin I extends between and is secured in these ears. There is also a longitudinal slot $d^3$ in the jaw shank between these ears. The fulcrum plate has through it an opening $e'$ of suitable length to permit the rocker M to pass through it. In the sides of this opening are the laterally extended notches $e^2$. The outer jaw shank c is provided with forwardly projecting ribs $c'$ and with an opening $c^2$ between said ribs. The rocker M is of such shape and size that it may pass through the openings in the two jaw shanks and in the fulcrum plate. Its rear end is forked and takes over the pin I. The fulcrum pin N passes through the rocker from side to side and its projecting ends are flattened so that they will fit in the notches $e^2$. A pivoting pin P is now driven through the ribs $c'$ and through the rocker and this pin not only serves as the pivotal connection between the outer jaw and the rocker, but serves to hold the rocker in the explained relation to the inner jaw and the fulcrum plate. Any suitable mechanism may be connected with the rocker for rocking it, and thereby to cause the jaws to move simultaneously and inversely toward and from the interposed cylindrical flange g. The mechanism shown consists of an angle lever R pivoted to the hub of the spider, a link S connecting one arm of this lever with the sliding sleeve Q on shaft F, a block t pivoted to the front end of the rocker, and a link T pivoted to one arm of the angle lever and adjustably connected with said block.

When it is desired to remove the outer jaw of the described mechanism, the associated pin P, which is the key pin of the whole train of mechanism, is driven out so as to disconnect the rocker from the outer jaw shank. The pivot pin connecting the angle lever R with the spider is then removed, which permits the rocker to be drawn forward and entirely free from its engagement with the inner jaw and the fulcrum plate. The outer jaw may now be removed by moving it radially outward if the clutch is in a position which leaves room for this movement. If not, the gibs J may be removed and this will permit the outer jaw to be moved forward and so wholly disconnected from the other mechanism. To remove the inner jaw one has only to disconnect and remove the fulcrum plate, and this permits the inner jaw to be moved forward and entirely separated from the supporting member.

As will be noted in Figs. 2 and 3 the part of the web $a^2$ which connects the two bars of an arm serves also to protect the inner end of the rocker and the inner jaw shank.

Although in the construction shown each arm has associated with it an independent fulcrum plate E, it is not intended that the appended claims shall exclude a construction in which the several fulcrum plates are connected together or are integral parts of a single piece.

Having described my invention, I claim:

1. In a friction clutch, the combination of a supporting member, a fulcrum plate detachably secured to the supporting member and having radial guide faces on its front and rear sides, inner and outer jaws sliding on the rear and front guide faces, respectively, of the fulcrum plate, and means for operating said jaws.

2. In a friction clutch, the combination of a supporting member having a radial arm, a fulcrum plate detachably secured to the front side of said arm so as to be removable forwardly therefrom and having radial guide faces on its front and rear sides, an inner jaw having a shank arranged in front of said arm and sliding on the rear guide face of said plate, an outer jaw having a shank sliding on the front guide face of the fulcrum plate, and means for operating said jaws comprising a rocker pivoted on said plate and operatively connected with said jaws.

3. In a friction clutch, the combination of inner and outer clutch jaws each of which has a shank, a supporting member having an arm provided with guide faces on its front side on which the shank of the inner jaw slides, a fulcrum plate secured to said supporting member and extending across the front side of the inner jaw shank and having guide faces on its front side on which the outer jaw shank slides, and a rocker pivotally connected with said jaw shanks and fulcrum plate.

4. In a friction clutch, the combination of a supporting member, two inversely and radially movable jaws, a fulcrum plate removably secured to said supporting member and forming with it a guide-way for the inner jaw, and being itself provided with guide-ways for the outer jaw, a rocker supported on said fulcrum plate and connected with said jaws, and means for operating said rocker.

5. In a friction clutch, the combination of a supporting member, a fulcrum plate removably secured to said supporting member and forming between it and the supporting member a guide-way for the shank of the inner jaw, a jaw having a shank which is mounted in said guide-way and has a hole through it and rearwardly extended ears, a pin secured to said ears, said fulcrum plate having through it a hole in the sides of which are laterally extended notches, gibs secured to said fulcrum plate and forming with it guide-ways for the shank of the outer jaw, an outer jaw having a shank which is movable in said guide-ways, a rocker having a pivot pin which projects laterally from its sides and is adapted to enter the said notches in the fulcrum plate, said rocker having a forked rear end adapted to embrace the pin on the inner jaw shank, and a removable pin engaging the outer jaw shank and the rocker.

6. In a friction clutch, the combination of a supporting member having a clutch arm comprised essentially of two parallel outwardly extended bars, a fulcrum plate secured to the front face of said bars and having ribs engaging the sides of said bars, there being between said fulcrum plate and bars guide-ways for the shank of the inner jaw, gibs secured to the front face of said fulcrum plate and forming with it guide-ways for the shank of the outer jaw, two jaws whose shanks respectively slide in said guide-ways, and a rocker pivoted to said fulcrum plate and pivotally connected with said jaw shanks.

In testimony whereof, I hereunto affix my signature in the presence of two witnesses.

HARRY J. SMITH.

Witnesses:
  E. B. GILCHRIST,
  H. R. SULLIVAN.